United States Patent
Brennan et al.

(10) Patent No.: US 9,421,618 B1
(45) Date of Patent: Aug. 23, 2016

(54) CLAMPING DEVICE FOR SECURING CABLES TO SUBMERGED FERROUS HULL SURFACE

(71) Applicants: Keith Brennan, Middletown, MD (US); Damien Carl Bretall, Baltimore, MD (US)

(72) Inventors: Keith Brennan, Middletown, MD (US); Damien Carl Bretall, Baltimore, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 330 days.

(21) Appl. No.: 14/282,313

(22) Filed: May 20, 2014

(51) Int. Cl.
*F16L 3/08* (2006.01)
*B23B 45/00* (2006.01)
*F16L 3/02* (2006.01)

(52) U.S. Cl.
CPC .. *B23B 45/00* (2013.01); *F16L 3/02* (2013.01)

(58) Field of Classification Search
CPC .................................. B63B 45/00; F16L 3/02
USPC ............... 248/51, 74.1, 110, 111, 113, 206.5, 248/316.2, 316.3, 74.2; 114/218
See application file for complete search history.

(56) References Cited

U.S. PATENT DOCUMENTS

| | | | | |
|---|---|---|---|---|
| 1,520,716 A | * | 12/1924 | Judd | F16G 11/10 114/218 |
| 4,084,532 A | * | 4/1978 | Feder | B63B 21/08 114/218 |
| 4,195,587 A | * | 4/1980 | Voss | B63B 21/08 114/101 |
| 4,453,486 A | * | 6/1984 | Harken | B63B 21/08 114/218 |
| 4,465,011 A | * | 8/1984 | Merry | F16G 11/10 114/199 |
| 4,766,835 A | * | 8/1988 | Randall | F16G 11/10 114/218 |
| 4,926,399 A | | 5/1990 | Hickman | |
| 5,277,143 A | * | 1/1994 | Frangulea | B63B 43/16 114/227 |
| 6,016,286 A | * | 1/2000 | Olivier | B63B 21/66 114/245 |
| 8,554,830 B2 | | 10/2013 | Sladojevic | |
| 2012/0049020 A1 | * | 3/2012 | Stock | F16B 2/10 248/206.5 |

OTHER PUBLICATIONS

Magnetic Cable Guides, Schweitzer Engineering Laboratories—Over 20 Years of Engineering, Jun. 26, 2012, http://www.sel-com.com/magnetic_cable_guides.htm.

* cited by examiner

*Primary Examiner* — Gwendolyn Baxter
(74) *Attorney, Agent, or Firm* — Dave A. Ghatt

(57) ABSTRACT

A cable clamping arrangement for securing one or more cables to a submerged hull surface of a ship. The cable clamping arrangement includes a plurality of powerful magnetic clamping devices for attaching signal carrying cables to a submerged ferrous submerged hull surface. The cable clamping devices each have a low-profile and are dome shaped to reduce hydrodynamic interference when the ship is travelling at operational speeds. The clamps are equipped to grip a cable in a desired path at a desired tension, thereby increasing the ability to maintain the cable in a fixed manner on the surface while the ship is operating.

17 Claims, 8 Drawing Sheets

Figure 5C

CLAMPING DEVICE FOR SECURING CABLES TO SUBMERGED FERROUS HULL SURFACE

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The following description relates generally a cable clamping arrangement for securing a cable to a submerged bull surface, more particularly, a clamping arrangement including a plurality of powerful magnetic clamping devices for attaching signal carrying cables to a submerged ferrous submerged hull surface.

BACKGROUND

During sea trials it is often required to mount data collection devices, such as video cameras and accompanying cables, to the underwater portion of the hull of a ship. These devices may be mounted in a dry dock. Alternatively, the cables may also be mounted using underwater methods by divers. Some installation methods may be applicable to both dry dock environments and underwater environments.

Regardless of the method in which the cables may be secured to the bull, there is a need for improved cable-mounting when the cable is mounted below the ship's waterline for the purpose of underwater operations. For example, a commonly used method for securing cables to the submerged hull surface is to weld attachment points. The welding may be done in a dry dock scenario or may be carried out by underwater welding. Regardless, these permanent welds are very expensive, not easily reversed, and not always possible since the inside of the vessel must be certified as gas free. Another known method is to cut holes in the ship hull, install a waterproof pass-through, and run the cables directly through from the inside of the hull. This is also expensive, and could risk sinking the vessel.

The implementation of magnetic cable fasteners or guides has been used in non-water-related environments. If implemented for submerged hulls it would be beneficial because magnetic cable fasteners would simplify underwater cable installations. However, the prior art does not teach cable fasteners or guides that are robust enough for either underwater installation, or strong enough to work in after-installation applications, such as when the ship is travelling at operational speeds. For example, the prior art teaches a magnetic cable guide, but this device uses a magnet that only has a magnetic force of 2.2 lbs. This will not work in an underwater environment, as it is not strong enough to hold the cable firmly or to prevent damage by strumming since it does not have internal clamping to firmly hold the cable.

Thus it is desired to have a magnetic cable clamp that robust enough for underwater implementation, that can properly clamp and maintain a cable in position even when exposed to working conditions when the ship is traveling at operational speeds. It is also desired to have a clamp that minimizes hydrodynamic drag and that is not easily pulled off the hull when the ship is in operation. It is also desired to have magnetic clamps that are easily and securely installed and easily removed. It is also desired that the signals traveling through the cable are not disturbed by the magnets.

SUMMARY

In one aspect, the invention is a cable clamping device for securing one or more cables to underwater ferrous surfaces. In this aspect, the cable clamping device has a low-profile housing body that is substantially dome shaped. The low-profile housing body includes a first outer section having a first bore for receiving a first magnet and a second outer section having a second bore for a second magnet. The low-profile housing body also includes a middle section having a bottom arch portion defining a cable receiving opening. The middle section extends from the first outer section to the second outer section, wherein the first outer section, the second outer section, and the middle section form a truncated n-shaped side profile. In this aspect, the cable clamping device also includes a first magnet within the first bore, a second magnet within the second bore, and a cable gripping member within the bottom arch portion of the middle section for gripping the cable within the cable receiving opening.

In another aspect, the invention is a cable clamping arrangement for securing a cable to a submerged hull surface. In this aspect the cable clamping arrangement includes a submerged ferrous hull surface, a cable for carrying signals, a plurality of cable clamping devices, and a cable tension sensor for determining when the cable is secured at a desired tension. In this aspect, the cable clamping devices are magnetically attached to submerged ferrous hull surface, wherein the cable is held along the submerged ferrous hull surface in a desired path by the plurality of cable clamping devices. According to the invention, the cable is in working contact with the cable tension sensor ensuring that the cable is extended at the desired tension. Each of the plurality of cable clamping devices has a low-profile housing body that is substantially dome shaped. The low-profile housing body has a first outer section having a first bore for receiving a first magnet, a second outer section having a second bore for a second magnet, and a middle section having a bottom arch portion defining a cable receiving opening. The middle section extends from the first outer section to the second outer section, wherein the first outer section, the second outer section, and the middle section form a truncated n-shaped side profile. In this aspect, each cable clamping device further includes a first magnet within the first bore, a second magnet within the second bore, and a cable gripping member within the bottom arch portion of the middle section for gripping the cable within the cable receiving opening.

BRIEF DESCRIPTION OF THE DRAWINGS

Other features will be apparent from the description, the drawings, and the claims.

DETAILED DESCRIPTION

Figures 1A, 1B, 1C:
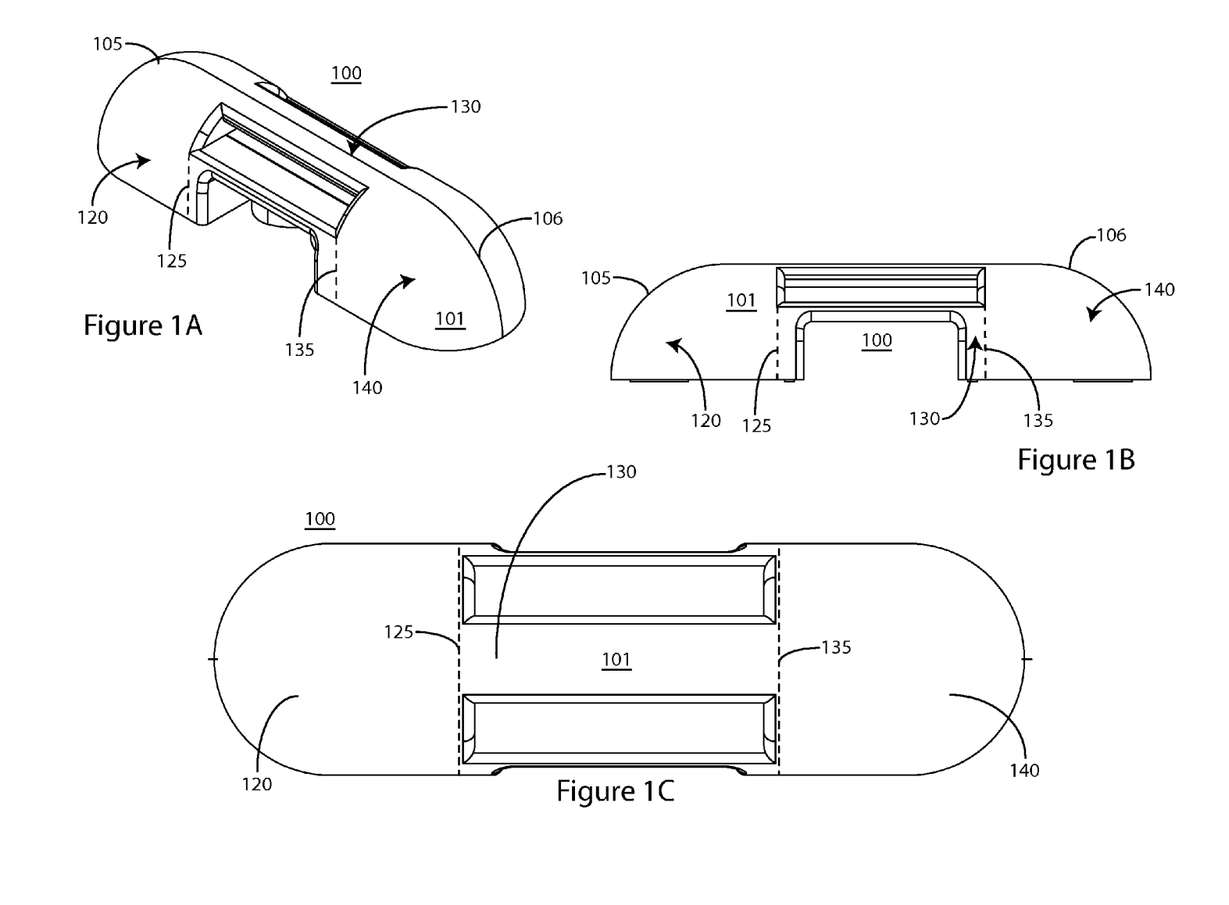
FIG. 1A is an exemplary perspective view of a cable clamping device for securing cables to underwater ferrous surfaces, according to an embodiment of the invention.
FIG. 1B is an exemplary side view of a cable clamping device for securing cables to underwater ferrous surfaces, according to an embodiment of the invention.
FIG. 1C is an exemplary top view of a cable clamping device for securing cables to underwater ferrous surfaces, according to an embodiment of the invention.

FIG. 1A is an exemplary perspective view of a cable clamping device 100, according to an embodiment of the invention. FIGS. 1B and 1C show side and top views, respectively, of the cable clamping device. It should be noted that FIGS. 1A, 1B, and 1C show the general structure and shape of the cable clamping device 100. Subsequent figures will highlight the individual elements and features of the clamping device 100.

As outlined below, the cable clamping device 100 is for securing cables, such as data and video cables, to underwater ferrous surfaces. The underwater ferrous surface may be a submerged vessel surface such as the hull of a ship. The clamping device 100 secures the cable in a manner that allows the cable to withstand hydrodynamic forces created when the vessels are operating throughout their full range of speeds. FIGS. 1A, 1B, and 1C all show the low-profile housing 101 of the cable clamping device 100, having rounded edges 105 and 106, the housing 101 being substantially dome shaped. This low-profile rounded structure reduces hydrodynamic drag when the vessel is operating. It should be noted that although the cable clamping device 100 with the low-profile housing 101 is particularly designed to withstand hydrodynamic forces when submerged on travelling water vessel, the cable clamping device 100 may be used in above-water applications, i.e., in situations when the device 100 is not submerged.

As stated above, FIGS. 1A, 1B, and 1C show the general structure of the cable clamping device 100. The low-profile housing 101 may be broken up into three sections as shown. FIGS. 1B and 1C show the low-profile housing having a first outer section 120, a middle section 130, and a second outer section 140. As shown, the sections are divided by imaginary (dotted) lines 125 and 135. As shown, the middle section 130 extends from the first outer section 120 to the second outer section 140. As shown in the side view of FIG. 1B, the first outer section 120, the second outer section 140, and the middle section 130 form a truncated n-shaped side.

Figure 2A:
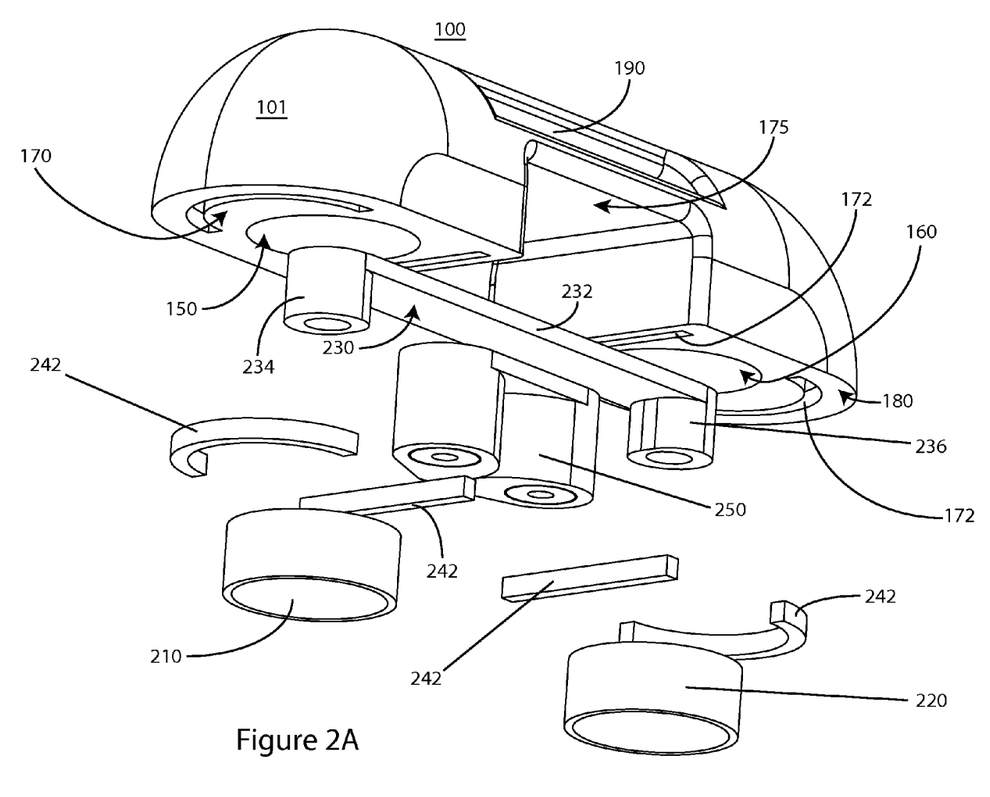
FIG. 2A is an exemplary exploded view of the cable clamping device, according to an embodiment of the invention.

FIG. 2A is an exemplary exploded view of the cable clamping device 100, according to an embodiment of the invention. The FIG. 2A depiction shows the different elements of the device 100. FIG. 2A shows the low-profile housing 101 being substantially dome shaped. As shown, the low-profile housing 101 has a first bore 150 and a second bore 160. The low-profile housing 101 includes a first substantially flat base portion 170 and a second substantially flat base portion 180. The first substantially flat base portion 170 and the second substantially flat base portion 180 are separated by a bottom arch portion 175. As shown, the bottom arch portion 175 is between the first substantially flat base portion 170 and the second substantially flat base portion 180, hence the truncated n-shaped side profile outlined above. The bottom arch portion 175 defines a cable receiving opening through which a cable is threaded and gripped. It should be noted that that the bottom arch portion 175 and accompanying elements may also be dimensioned to thread and grip a plurality of cables simultaneously. The substantially flat base portions 170 and 180 both include grooves 172. The grooves may be linear and/or curved, but may also have other shapes. The low-profile housing 101 also includes handle grooves 190, which allow for easy installation and removal by hand.

The exploded illustration of FIG. 2A also shows a first magnet 210 for the first bore 150 and a second magnet 220 for the second bore 160. FIG. 2A also shows a faraday cage 230, which as outlined below, prevents the first and second magnets (210, 220) from interfering with any signal travelling through a cable that is clamped by the device 100. The faraday cage 230 includes a flat elongated steel bar 232 having a first connecting protrusion 234 at one end and a second connecting protrusion 236 at the other end. FIG. 2A also shows pads 242, which as outlined below are for the grooves 172, and like the grooves 172 may be linear and/or curved, but may also have other shapes. FIG. 2A also shows a cable gripping member 250.

Figure 2B:
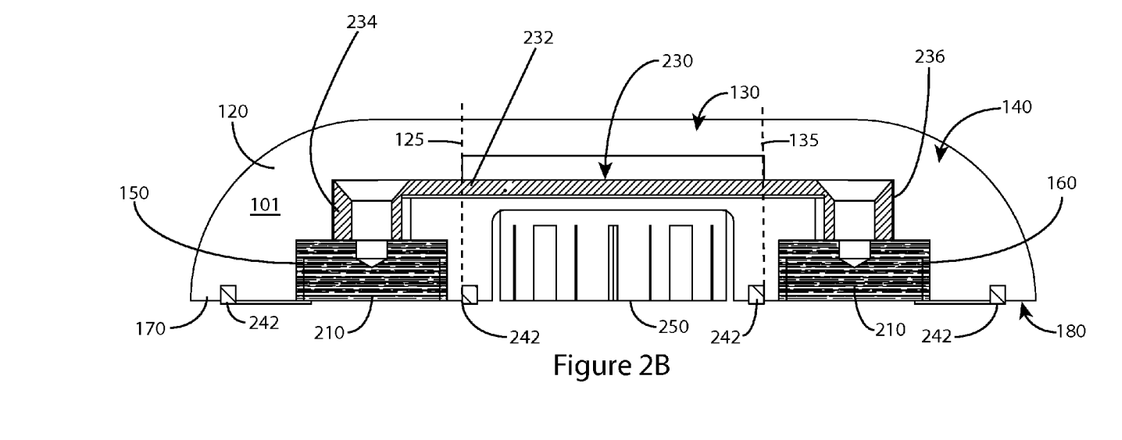
FIG. 2B is an exemplary side section view of the cable clamping device, showing the elements in an assembled state, according to an embodiment of the invention.

FIG. 2B is an exemplary side section view of the cable clamping device 100, showing the elements in an assembled state, according to an embodiment of the invention. FIG. 2B also shows imaginary lines 125 and 135 demarking the first outer section 120, the middle section 130, and the second outer section 140. FIG. 2B shows the first magnet 210 within the first bore 150 in the first outer section 120 of the housing 101. The second magnet 220 is within the second bore 160 in the second outer section 140 of the housing 101. The first and second magnets 210 and 220, extend through the first and second bores 150 and 160 enough so that they are exposed at the respective substantially flat base portions 170 and 180. Thus when the device 100 is attached to a surface the magnets 210 and 220 contact the surface. As outlined below, the magnets 210 and 220 may be high-pull rare earth magnets, and may be encased by an outer steel ring. The magnets do not have to be made of rare earth materials as long as they are of sufficient strength.

FIG. 2B shows the faraday cage 230. As outlined above, the faraday cage prevents the first and second magnets (210, 220) from interfering with any signal travelling through a cable that is clamped by the device 100. The faraday cage 230 includes a flat elongated steel bar 232 having a first connecting protrusion 234 connected to the first magnet 210. The second connecting protrusion 236 at the other end of the elongated steel bar 232 is connected to the second magnet 220. FIG. 2B shows the faraday cage 230 positioned within the low-profile housing body 101, extending from the first outer section 120, through the middle section 130, to the second outer section 140. FIG. 2B shows screws 211 and 221 connecting magnets 210 and 220 to the respective connecting protrusions 234 and 236, and maintaining the magnets 210 and 220 and the faraday cage 230 within the housing 101. It should be noted that as opposed to the screws 211 and 221, other connectors may also be used to attach the magnets 210 and 220 to the connecting protrusions 234 and 236. Additionally, adhesives may also be used to securely maintain the magnets 210 and 220 and the connecting protrusions 234 and 236 within the housing 101.

FIG. 2B also shows the cable gripping member 250 within the bottom arch portion 175 of the middle section 130 for gripping the cable within the cable receiving opening. As outlined below, the cable gripping member may be a first rotatable cable cam 252 biased to rotate in a first direction, and a second rotatable cable cam 254 biased to rotate in a second direction opposite to first direction. In operation, the cable extends between the first and second rotatable cable cams 252 and 254. FIG. 2B also shows pads 242, which are fastened in the grooves 172. As stated above, the pads 242 and grooves 172 may be linear and/or curved, but may also have other shapes. The pads 242 may be made from a rubber material, and in operation they contact the submerged hull surface, increasing friction between the cable clamping device 100 and the surface, thus preventing sliding of the cable clamping device 100. They may also be made from other high-friction material.

Figure 2C:
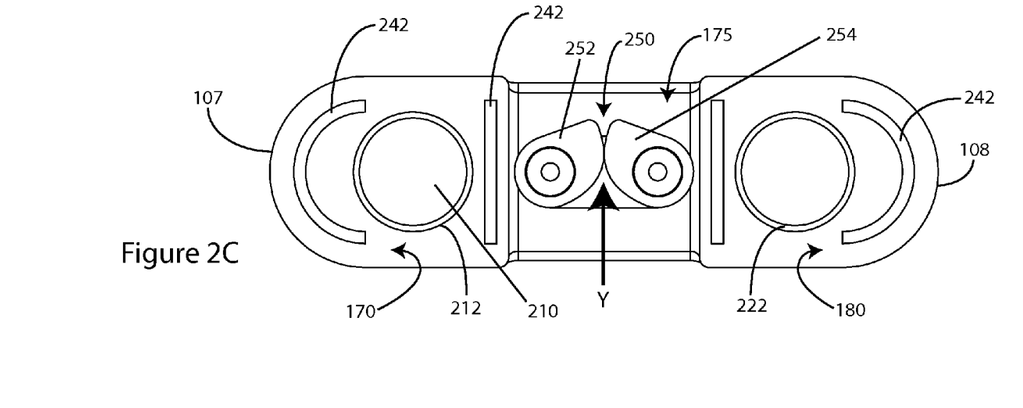
FIG. 2C is an exemplary bottom view of the cable clamping device, showing the elements in an assembled state, according to an embodiment of the invention.

FIG. 2C is an exemplary bottom view of the cable clamping device 100, according to an embodiment of the invention. The bottom view of FIG. 2C illustrates the different elements as arranged at the bottom of the cable clamping device 100. FIG. 2C shows the first substantially flat base portion 170 and the second substantially flat base portion 180. As shown, the first substantially flat base portion 170 and the second substantially flat base portion 180 are separated by a bottom arch portion 175. The first substantially flat base portion 170 houses the first magnet 210 and rubber pads 242. The second substantially flat base portion 180 houses the first magnet 220 and rubber pads 242. As shown, the magnets 210 and 212 may optionally be encased in outer steel rings 212 and 222. FIG. 2C also show the outer edge portions 107 and 108 of the substantially fat base portions 170 and 180, respectively, being substantially concentric with the cylindrical magnets 210 and 220. It should be noted that although the magnets 210 and 220 are cylindrical, according to other embodiments, the magnets may have other shapes.

As outlined above, the bottom arch portion 175 defines a cable receiving opening through which one or more cables may be threaded and gripped. FIG. 2C shows the cable gripping member 250 being a first rotatable cable cam 252 biased to rotate in a first direction $R_1$ as shown, and a second rotatable cable cam 254 biased to rotate in a second direction $R_2$ opposite to first direction. Arrow Y shows the direction in which a cable approaches and is threaded between first and second rotatable cams 252 and 254.

Figure 2D:
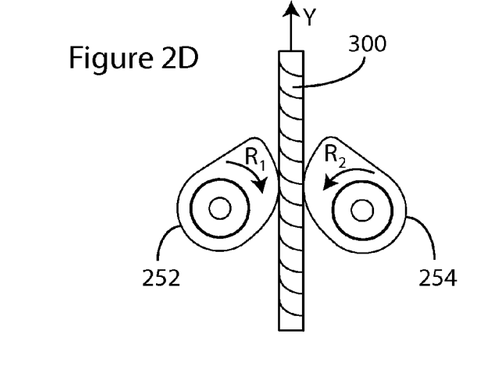
FIG. 2D is an exemplary bottom view of the gripping member as it receives a cable, according to an embodiment of the invention.

FIG. 2D is an exemplary bottom view of the gripping member 250 as it receives a cable 300, according to an embodiment of the invention. As illustrated, the cable 300 enters in direction Y and pushes the first and second rotatable cams 252 and 254, which forces the cams to rotate in directions opposite to their respective predisposed rotation directions $R_1$ and $R_2$. As the cable 300 extends between the first and second rotatable cable cams 252 and 254, the cable is maintained at a desired tension as the cams are biased to rotate in the respective rotation directions $R_1$ and $R_2$. This prevents the cable 300 from slipping or from excessively vibrating when the ship is travelling at operational speeds.

Although FIG. 2D shows only one cable 300, the cable gripping member 250, i.e., the first and second rotatable cable cams 252 and 254, may be dimensioned to grip a plurality of cables 300 simultaneously, along their respective outer surfaces of the cams 252 and 254. According to this embodiment, the cables are vertically stacked as they are threaded and gripped by the cams 252 and 254. Thus, for example, first and second rotatable cable cams 252 and 254 may simultaneously grip two vertically stacked cables 300. The ability to simultaneously grip a plurality of cables 300 may depend on the size of the cables 300 with respect to the size and outer surface area of the cams 252 and 254.

Figure 2E:
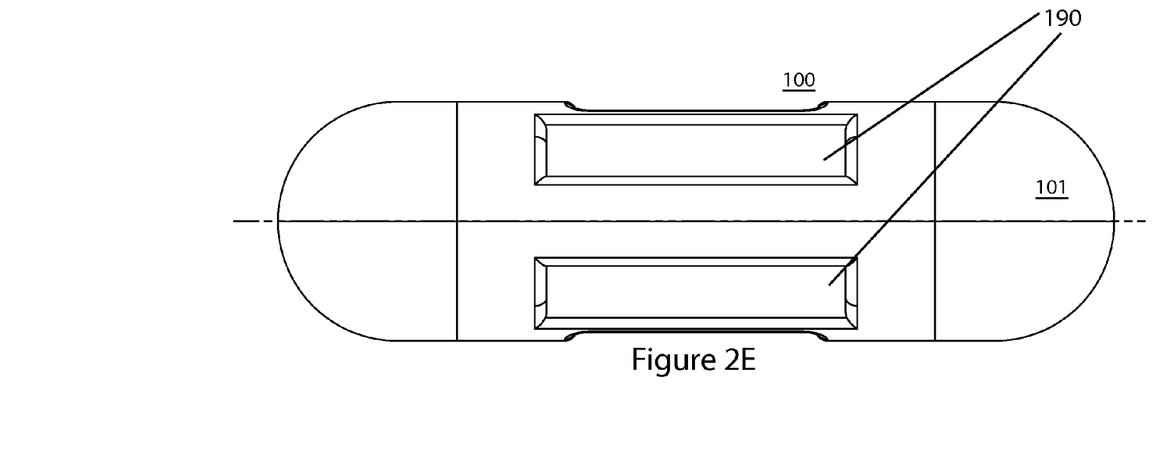
FIG. 2E is an exemplary top view of the cable clamping device, showing the elements in an assembled state, according to an embodiment of the invention.

FIG. 2E is an exemplary top view of the cable clamping device 100, according to an embodiment of the invention. The top view of FIG. 2E shows the first and second elongated handle grooves 190 in the middle section of the housing 101, forming a handle. A diver or other operator may use the handles to hold and carry the cable clamping device 100. The handle grooves 190 also act as pry-points, facilitating the removal of the clamping device 100 from the submerged surface.

Figure 3A:
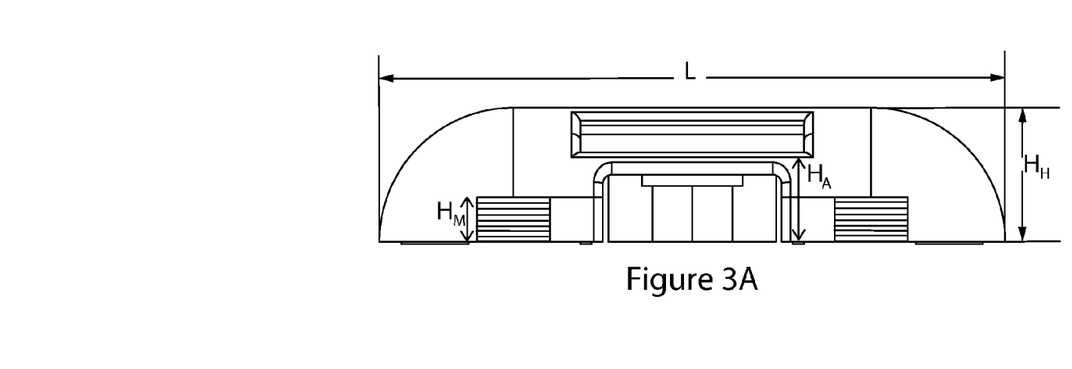
FIG. 3A is an exemplary side view of the cable clamping device showing dimensions, according to an embodiment of the invention.
Figure 3B:
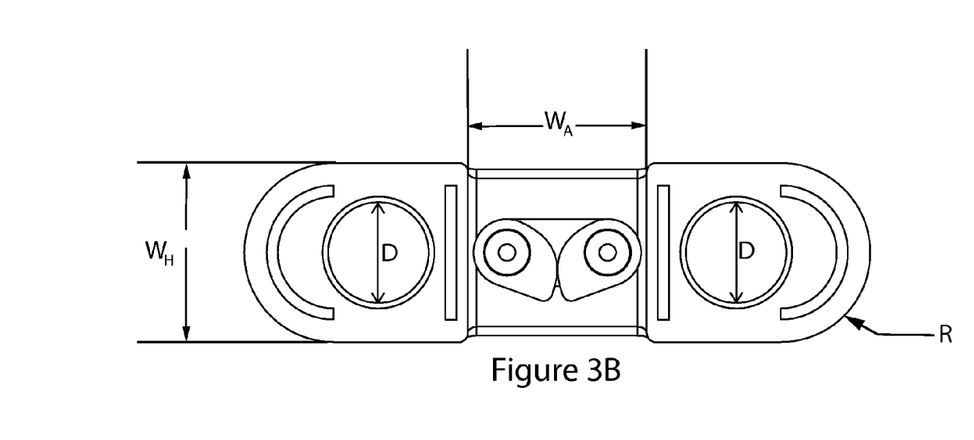
FIG. 3B is an exemplary bottom view of the cable clamping device showing dimensions, according to an embodiment of the invention.

FIG. 3A is an exemplary side view of the cable clamping device 100 showing dimensions, according to an embodiment of the invention. FIG. 3B is an exemplary bottom view of the cable clamping device 100 showing dimensions, according to an embodiment of the invention. The low-profile rounded structure of the clamping device, as well as the dimensions helps to reduce hydrodynamic drag when the device 100 is attached to a vessel that is travelling at operational speeds. FIG. 3A shows the housing 101 having a length L and a height $H_H$. FIG. 3A also shows the bottom arch portion 175 having a height $H_A$. FIG. 3B shows the housing 101 having a housing width $W_H$. FIG. 3A shows the magnets 210 and 220 having a height $H_M$. FIG. 3B also shows the bottom arch portion 175 having a width $W_A$, defining the width of the cable receiving opening through which a cable is threaded and gripped. FIG. 3B shows both of the first and second magnets 210 and 220 having a diameter D. FIG. 3B also shows the outer edge portions 107 and 108 having a radius of curvature R.

The dimensions of the housing 101 may be varied according to the application and environment. However, according to a particular embodiment of the invention, the housing 101 has a length L of about 7 in., a height $H_H$ of about 1.50 in., a housing width $W_H$ of about 2 in., and an arch width $W_A$ of about 2 in. According to this embodiment, the bottom arch portion height $H_A$ is about 0.75 in. The outer edge portions 107 and 108 have a radius of curvature R of about 1 in. According to this particular embodiment, the magnets 210 and 220 have a diameter D of about 1.27 in., and a height $H_M$ of about 0.5 in. According to this embodiment, the magnets 210 and 220 are high-pull rare earth magnets, each having a pull of at least 50 lbs. The powerful magnets 210 and 220 provide the necessary force to securely attach the clamping device 100 to ferrous surfaces. In addition to this attaching force, as stated above, the low-profile rounded structure of the clamping device, as well as the dimensions helps to reduce hydrodynamic drag, thereby maintaining the device 100 on ferrous hull surfaces even when the vessel is travelling at operational speeds.

Figures 4, 5A:
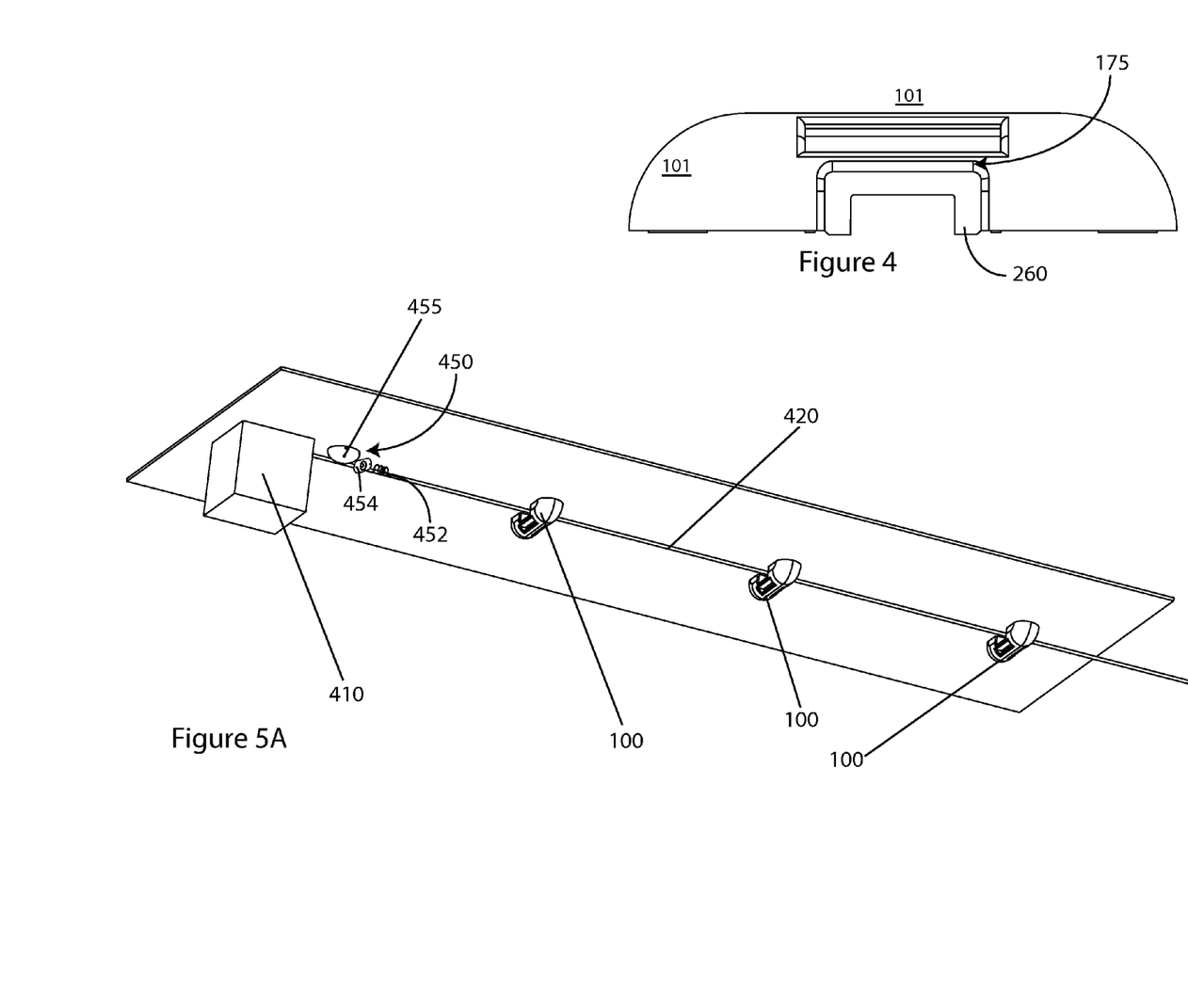
FIG. 4 is an exemplary illustration of the cable clamping device, according to an embodiment of the invention.
FIG. 5A is an exemplary illustration of a cable clamping arrangement for securing a cable to a submerged hull surface, according to an embodiment of the invention.

FIG. 4 is an exemplary illustration of the cable clamping device 100, according to an embodiment of the invention. The elements of the cable clamping device 100 are as outlined above, except the cable gripping member 250 is replaced by cable gripping member 260. As with gripping member 250, the cable gripping member 260 is placed within the bottom arch portion 175 of the middle section 130. The cable gripping member 260 may be a foam insert or a rubber insert lining the bottom arch portion 175. In operation, the insert 260 presses against and grips the cable, thereby preventing the cable from slipping or excessively vibrating. Depending on the dimensions of the foam or rubber insert 260, a plurality of cables may be gripped simultaneously. According to this embodiment, the simultaneously gripped cables 300 may be horizontally stacked.

FIG. 5A is an exemplary illustration of a cable clamping arrangement 400 for securing a cable to a submerged hull surface, according to an embodiment of the invention. FIG. 5A shows a submerged ferrous hull surface 401, which as outlined above may be the hull surface of a ship. FIG. 5A also shows a data collection device 410, such as a camera. A signal carrying cable 420 extends from the device 410. The signal carrying cable 420 may be a coaxial or a High Definition Multimedia Interface (HDMI) for example. FIG. 5A also shows a plurality of cable clamping devices 100, gripping and clamping the cable 420 to the submerged ferrous hull surface 401. The features of each of the plurality of cable clamping devices 100 shown in FIG. 5A are as outlined above with respect to FIGS. 1A-4. It should be noted that although Figure SA only shows three clamping devices, any desired number of clamping devices may be used, depending on the length of the cable 420 and the desired tension levels for the cable 420.

As shown, the cable 420 is held taut in a desired path by the clamping devices 100 as it extends over the surface 401. The plurality of cable clamping devices 100 clamp down on the cable 420 maintaining the cable at a desired amount of tension. The cable clamping arrangement 400 shown in FIG. 4 also includes a cable tension sensor 450 for determining when the cable is secured at a desired tension. According to an embodiment of the invention, the cable tension sensor 450 has a noose 452 through which the cable is threaded. The sensor 450 may also include an audio clicker 454.

Figure 5B:
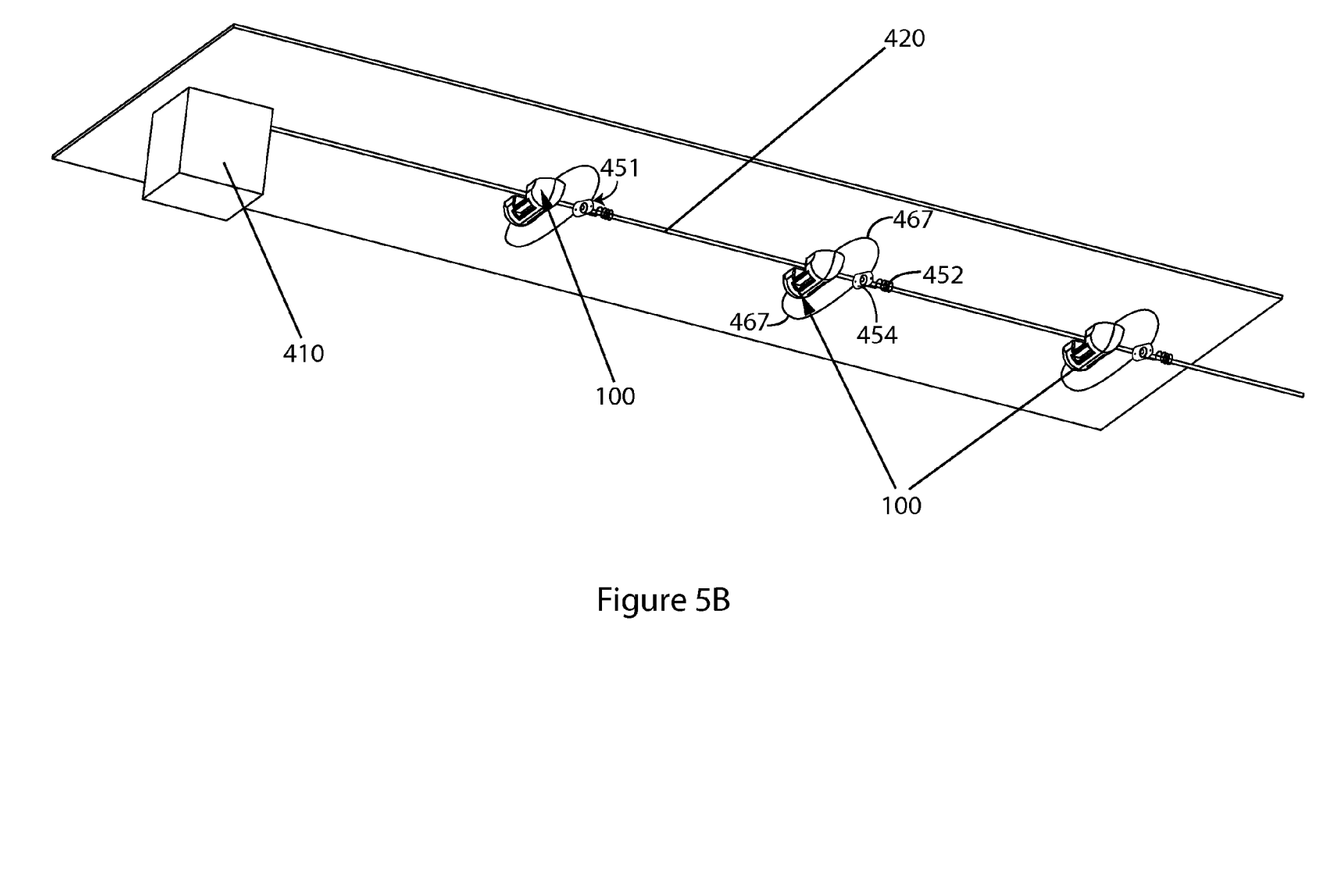
FIG. 5B is an exemplary illustration of a cable clamping arrangement for securing a cable to a submerged hull surface, according to an embodiment of the invention.
Figure 5C:
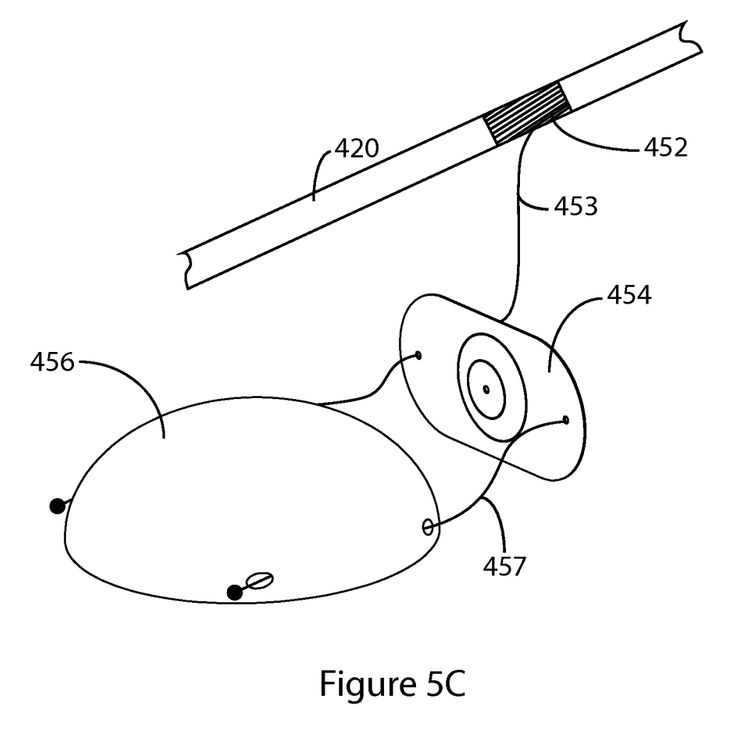
FIG. 5C is an exemplary illustration of the cable tension sensor, according to an embodiment of the invention.

FIG. 5C is an exemplary illustration of the cable tension sensor 450 showing elements of the sensor 450, according to an embodiment of the invention. FIG. 5C shows the sensor 450 with the noose 452 which is wrapped around the cable 420. FIG. 5C also shows the audio clicker 454. According to the embodiment as shown in FIG. 5C, the sensor 450 also includes a dome shaped magnet 456 for magnetically anchoring the cable tension sensor 450 to the surface 401. The magnet 256 may also be a high-pull magnet. Because the magnet 456 is dome shaped, the magnet 456 resists hydrodynamic forces, thereby maintaining an attachment to the surface 401 even while the water vessel is operating.

As shown, the clicker 454 is attached to the magnet 456 by a pair of strings/wires 457. The clicker 454 is also attached to the noose 452 by a string/wire 453. In operation, when the cable 420 tugs the noose 452 to an extent that indicates that a desired cable tension has be reached, the connected audio clicker 454 transmits an audio click, indicating to an operator, such as a diver, that the desired cable tension has been ascertained. Returning to FIG. 5A, although the figure shows only one cable tension sensor 450, the arrangement 400 may include additional cable tension sensors 450 along the cable path.

FIG. 5B is an exemplary illustration of a cable clamping arrangement 475 for securing a cable to a submerged hull surface, according to an embodiment of the invention. The arrangement 475 is similar to that of FIG. 5A, with like elements being numbered accordingly. FIG. 5B shows a submerged ferrous hull surface 401. FIG. 5B also shows a data collection device 410 such as a camera, and a signal carrying cable 420 extending from the device 410. FIG. 5B also shows a plurality of cable clamping devices 100, gripping and clamping the cable 420 to the submerged ferrous hull surface 401. The features of each of the plurality of cable clamping devices 100 shown in FIG. 5B are as outlined above with respect to FIGS. 1A-4.

As shown in FIG. 5B, the cable clamping arrangement 475 also includes a plurality of cable tension sensors 451 for determining when the cable is secured at a desired tension. In the arrangement 475 however, each sensor 451 is attached to a cable clamping device 100. Similar to the cable tension sensor 450 as outlined with respect to the embodiment of FIGS. 5A and 5C, each cable tension sensor 451 has a noose 452 through with the cable is threaded, and an audio clicker 454 attached to the noose 452. However, each audio clicker 454 is directly attached to the housing 101 of the respective cable clamping device 100, as opposed to being attached to the surface 401. As shown, each sensor 451 may be attached by a pair of wires 467, attached at extreme sides of the housing 101, thereby providing stability to the arrangement. Thus the cable tension sensors 451 do not require magnets. Regarding the tension sensing operations, the sensors 451 operate similarly to the sensor 450, as outlined above. Because each sensor 451 is mounted on the housing 101 of a respective clamping device 100, a cable tension determination can be made at each clamping location.

Regarding the cable clamping arrangements 400 and 475 as outlined above, and as illustrated in FIGS. 5A and 5B, these arrangements illustrate only one cable 420 being held by the cable clamping devices 100. It should be noted that according to embodiments of the invention, multiple cables 420 may be held by the cable clamping devices 100. As stated above, in embodiments of the cable clamping device 100 having the cable gripping member 250, the rotatable cable cams 252 and 254 may be dimensioned to grip a plurality of cables 420 simultaneously, in which the cables 420 are vertically stacked. In embodiments of the cable clamping device 100 having the cable gripping member 260, the form or rubber inserts 260 may be dimensioned to hold multiple cables.

Additionally, as outlined above, although the cable clamping device 100 with the low-profile housing 101 is particularly designed to withstand hydrodynamic forces when submerged on travelling water vessel, the cable clamping device 100 may be used in above-water applications, i.e., in situations when the device 100 is not submerged. Thus, according to another embodiment, the clamping arrangement 400 shown in FIG. 5A may be applied in above-water applications. Similarly, the clamping arrangement 475 shown in FIG. 5B may also be applied in above-water applications.

What has been described and illustrated herein are preferred embodiments of the invention along with some variations. The terms, descriptions and figures used herein are set forth by way of illustration only and are not meant as limitations. For example, although the underwater ferrous surface may be a submerged vessel surface such as the hull of a ship, the underwater ferrous surface may a submarine hull surface. Those skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. A cable clamping device for securing one or more cables to underwater ferrous surfaces, the cable clamping device comprising:
   a low-profile housing body being substantially dome shaped, the low-profile housing body comprising:
   a first outer section having a first bore for receiving a first magnet;

a second outer section having a second bore for a second magnet;

a middle section having a bottom arch portion defining a cable receiving opening, the middle section extending from the first outer section to the second outer section, wherein the first outer section, the second outer section, and the middle section form a truncated n-shaped side profile;

the cable clamping device further comprising:

a first magnet within the first bore;

a second magnet within the second bore; and a cable gripping member within the bottom arch portion of the middle section for gripping the one or more cables within the cable receiving opening.

2. The cable clamping device of claim 1, further comprising a faraday cage that prevents the first and second magnets from interfering with any signal travelling through the one or more cables, wherein the faraday cage comprises, a flat elongated steel bar having a first connecting protrusion at one end attached to the first magnet, and a second connecting protrusion at another end attached to the second magnet, wherein the faraday cage is positioned within the housing body, extending from the first outer section through the middle section to the second outer section.

3. The cable clamping device of claim 2, wherein the low-profile housing body further comprises a first substantially flat base portion and a second substantially flat base portion, wherein the bottom arch portion is between the first substantially flat base portion and the second substantially flat base portion, and wherein the first magnet is exposed at the first substantially flat base portion and the second magnet is exposed at the second substantially flat base portion, so that each of the first and second magnets directly contact the underwater ferrous surface, and wherein each of the first and second magnets are high-pull rare earth magnets, each having a pull of at least 50 lbs.

4. The cable clamping device of claim 3, wherein the low-profile housing body further comprises a plurality of grooves in the first and second substantially flat base portions, the cable clamping device further comprising a plurality of rubber pads secured within the plurality of grooves, the plurality of rubber pads contacting the underwater ferrous surface, thereby increasing friction between the cable clamping device and the underwater ferrous surface.

5. The cable clamping device of claim 4, wherein the low-profile housing body further comprises first and second elongated handle grooves in the middle section forming a handle.

6. The cable clamping device of claim 5, wherein the cable gripping member within the bottom arch portion of the middle section comprises:

a first rotatable cable cam biased to rotate in a first direction; and a second rotatable cable cam biased to rotate in a second direction opposite to first direction, wherein the cable extends between the first and second rotatable cable cams, and wherein the cable is maintained at a desired tension by the oppositely biased first and second rotatable cams, thereby preventing the one or more cables from slipping or excessively vibrating.

7. The cable clamping device of claim 5, wherein the cable gripping member within the bottom arch portion of the middle section comprises a foam insert lining the bottom arch portion, wherein the foam insert presses against and grips the one or more cables, thereby preventing the one or more cables from slipping or excessively vibrating.

8. A cable clamping arrangement for securing a cable to a submerged hull surface, the arrangement comprising:

a submerged ferrous hull surface;

a cable for carrying signals;

a plurality of cable clamping devices; and one or more cable tension sensors for determining when the cable is secured at a desired tension, wherein each of the cable clamping devices are magnetically attached to submerged ferrous hull surface, wherein the cable is held along the submerged ferrous hull surface in a desired path by the plurality of cable clamping devices, wherein the cable is in working contact with the cable tension sensor ensuring that the cable is extended at the desired tension, wherein each of the plurality of cable clamping devices comprises:

a low-profile housing body being substantially dome shaped, the low-profile housing body comprising:

a first outer section having a first bore for receiving a first magnet;

a second outer section having a second bore for a second magnet;

a middle section having a bottom arch portion defining a cable receiving opening, the middle section extending from the first outer section to the second outer section, wherein the first outer section, the second outer section, and the middle section form a truncated n-shaped side profile;

each cable clamping device further comprising:

a first magnet within the first bore;

a second magnet within the second bore; and a cable gripping member within the bottom arch portion of the middle section for gripping the cable within the cable receiving opening.

9. The cable clamping arrangement of claim 8, wherein each of the plurality of cable clamping devices further comprises a faraday cage that prevents the first and second magnets from interfering with the signal travelling through the cable, wherein the faraday cage comprises, a flat elongated steel bar having a first connecting protrusion at one end attached to the first magnet, and a second connecting protrusion at another end attached to the second magnet, wherein the faraday cage is positioned within the housing body, extending from the first outer section through the middle section to the second outer section.

10. The cable clamping arrangement of claim 9, wherein in each of the plurality of cable clamping devices, the low-profile housing body further comprises a first substantially flat base portion and a second substantially flat base portion, wherein the bottom arch portion is between the first substantially flat base portion and the second substantially flat base portion, and wherein the first magnet is exposed at the first substantially flat base portion and the second magnet is exposed at the second substantially flat base portion, so that each of the first and second magnets directly contact the submerged ferrous hull surface, and wherein each of the first and second magnets are high-pull rare earth magnets having a pull of at least 50 lbs.

11. The cable clamping arrangement of claim 10, wherein in each of the plurality of cable clamping devices, the low-profile housing body further comprises a plurality of grooves in the first and second substantially flat base portions, each cable clamping device further comprising a plurality of rubber pads secured within the plurality of grooves, the plurality of rubber pads contacting the submerged ferrous hull surface, thereby increasing friction between the cable clamping device and the submerged ferrous hull surface.

12. The cable clamping arrangement of claim 11, wherein in each of the plurality of cable clamping devices, the housing body further comprises first and second elongated handle grooves in the middle section forming a handle.

13. The cable clamping arrangement of claim 12, wherein each of the one or more cable tension sensors comprise a noose through with the cable is threaded, and an audio clicker, wherein the noose is attached to the audio clicker, and wherein when the cable tugs the noose to an extent that indicates that a desired cable tension has been reached, the audio clicker transmits an audio click, indicating to an operator that the desired cable tension has been ascertained.

14. The cable clamping arrangement of claim 13, wherein in each of the plurality of cable clamping devices, the cable gripping member within the bottom arch portion of the middle section comprises:
- a first rotatable cable cam biased to rotate in a first direction; and
- a second rotatable cable cam biased to rotate in a second direction opposite to first direction, wherein the cable extends between the first and second rotatable cable cams, and wherein the cable is maintained at a desired tension by the oppositely biased first and second rotatable cams, thereby preventing the cable from slipping or excessively vibrating.

15. The cable clamping arrangement of claim 13, wherein in each of the plurality of cable clamping devices, the cable gripping member within the bottom arch portion of the middle section comprises a foam insert lining the bottom arch portion, wherein the foam insert presses against and grips the cable, thereby preventing the cable from slipping or excessively vibrating.

16. The cable clamping arrangement of claim 13, wherein each audio clicker of the one or more cable tension sensors is attached to the housing of a respective one of the plurality of clamping devices, so that each clamping device is attached to a cable tension sensor.

17. The cable clamping arrangement of claim 13, wherein the one or more cable tension sensors comprise a plurality of cable tension sensors, wherein each of the plurality of cable tension sensors is mounted on a low-profile housing body of a respective one of the plurality of cable clamping devices.

* * * * *